(12) United States Patent
Kramer (10) Patent No.: US 11,326,775 B2
(45) Date of Patent: May 10, 2022

(54) VARIABLE SWIRL FUEL NOZZLE (71) Applicant: UNITED TECHNOLOGIES CORPORATION, Farmington, CT (US)

(72) Inventor: Stephen K. Kramer, Cromwell, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 804 days.

(21) Appl. No.: 14/759,481

(22) PCT Filed: Dec. 13, 2013

(86) PCT No.: PCT/US2013/075047
§ 371 (c)(1),
(2) Date: Jul. 7, 2015

(87) PCT Pub. No.: WO2014/133639
PCT Pub. Date: Sep. 4, 2014

(65) Prior Publication Data
US 2015/0354824 A1 Dec. 10, 2015

Related U.S. Application Data (60) Provisional application No. 61/770,574, filed on Feb. 28, 2013.

(51) Int. Cl.
F23R 3/28 (2006.01)
F23D 11/38 (2006.01)
(Continued)

(52) U.S. Cl.
CPC ............ *F23D 11/383* (2013.01); *F02C 7/232* (2013.01); *F23R 3/12* (2013.01); *F23R 3/286* (2013.01); *Y02T 50/60* (2013.01)

(58) Field of Classification Search
CPC .......... F23D 11/383; F23D 1/02; F23D 14/24; F23D 2900/14021; F23D 2900/14701;
(Continued)

(56) References Cited

U.S. PATENT DOCUMENTS 474,659 A 5/1892 Hollingsworth
1,826,776 A * 10/1931 Gunther ................ F23D 11/103
239/8
(Continued)

FOREIGN PATENT DOCUMENTS

DE 10137757 A1 2/2003
EP 0121877 A2 10/1984
(Continued)

OTHER PUBLICATIONS

International Search Report for related PCT Application No. PCT/US13/75047; report dated Apr. 9, 2014.
(Continued)

*Primary Examiner* — Gerald L Sung
*Assistant Examiner* — Rene D Ford
(74) *Attorney, Agent, or Firm* — Cantor Colburn LLP (57) ABSTRACT A fuel injector providing a flow of fuel having a variable swirl and/or variable effective area is disclosed. The fuel injector may have a nozzle defining a mixing chamber having an outlet proximate a centerline of the mixing chamber, a first fuel line in fluid communication with the mixing chamber and a second fuel line in fluid communication with the mixing chamber. The first fuel line may terminate in a tangential fuel inlet positioned tangential to the centerline of the nozzle, while the second fuel line may terminate in a radial fuel inlet positioned radial to the centerline of the nozzle.

20 Claims, 8 Drawing Sheets (51) Int. Cl.
*F02C 7/232* (2006.01)
*F23R 3/12* (2006.01)

(58) Field of Classification Search
CPC .. F02C 7/232; F23R 3/12; F23R 3/286; B05B 1/3426; B05B 1/3436; B05B 1/3478; F15C 1/16; Y10T 137/2109; Y10T 137/2115; F15D 1/0015; F04F 5/42
See application file for complete search history.

(56) References Cited

U.S. PATENT DOCUMENTS

| | | | | |
|---|---|---|---|---|
| 3,050,112 | A * | 8/1962 | Saunders | F23D 14/125 431/348 |
| 3,469,395 | A * | 9/1969 | Ranke | F02C 9/32 137/819 |
| 3,638,672 | A * | 2/1972 | Smith | F15C 1/16 137/813 |
| 3,727,636 | A * | 4/1973 | Simmons | F02M 59/46 137/541 |
| 4,594,848 | A * | 6/1986 | Mongia | F23R 3/26 60/39.23 |
| 4,683,715 | A * | 8/1987 | Iizuka | F02C 7/26 60/39.41 |
| 5,303,554 | A | 4/1994 | Faulkner | |
| 5,931,387 | A * | 8/1999 | Hurley | B05B 1/3426 239/492 |
| 5,934,555 | A * | 8/1999 | Dobbeling | B05B 1/3442 239/11 |
| 6,045,058 | A | 4/2000 | Doebbeling et al. | |
| 6,412,272 | B1 * | 7/2002 | Titterton, III | F23R 3/283 60/39.37 |
| 6,474,569 | B1 | 11/2002 | Brundish et al. | |
| 6,491,236 | B1 * | 12/2002 | Keller | F02C 3/30 239/399 |
| 8,066,509 | B2 * | 11/2011 | Eroglu | F23C 7/002 431/10 |
| 2006/0059914 | A1 | 3/2006 | Mantchenkov | |
| 2007/0029408 | A1 | 2/2007 | Hewitt | |
| 2009/0255256 | A1 | 10/2009 | McMasters et al. | |
| 2010/0126176 | A1 * | 5/2010 | Kim | F23C 7/006 60/748 |
| 2012/0291446 | A1 * | 11/2012 | Hirata | F23D 11/402 60/772 |

FOREIGN PATENT DOCUMENTS

| | | |
|---|---|---|
| EP | 924460 A1 * | 6/1999 |
| EP | 0924460 A1 | 6/1999 |
| JP | 2002-195511 A | 7/2002 |

OTHER PUBLICATIONS

European Search Report for Application No. EP 13 87 6506.
European Office Action for Application No. 13 876 506.0: dated Jan. 1, 2018.
Correspondence from the European Patent Office for European Application No. 13876506.0 dated Apr. 15, 2019, 9 Pages.
Correspondence from the European Patent Office for European Application No. 13876506.0 dated Jul. 30, 2018; 1 Page.

* cited by examiner

VARIABLE SWIRL FUEL NOZZLE

CROSS-REFERENCE TO RELATED APPLICATION

This application is a US National Stage under 35 USC § 371 of International Patent Application No. PCT/US13/75047 filed on Dec. 13, 2013 and claims priority to U.S. Provisional Patent Application Ser. No. 61/770,574 filed on Feb. 28, 2013.

FIELD OF THE DISCLOSURE

The present disclosure generally relates to nozzles and, more specifically, to fuel nozzles of fuel injectors for gas turbine engines.

BACKGROUND OF THE DISCLOSURE

A gas turbine engine, typically used as a source of propulsion in aircraft, operates by drawing in ambient air, combusting that air with a fuel, and then forcing the exhaust from the combustion process out of the engine. A fan and compressor section, having a low and high pressure compressor, rotate to draw in and compress the ambient air. The compressed air is then forced into the combustor, where it is split. A portion of the air is used to cool the combustor while the rest is mixed with a fuel and combusted.

The products of the combustion then travel out of the combustor as exhaust and through a turbine section. The turbine section, having a high and low pressure turbine, is forced to rotate as the exhaust passes through the turbine blades. The turbine section, fan, and compressor section are connected by concentrically mounted engine shafts running through the center of the engine. Thus, as the turbines rotate from the exhaust, the fan and corresponding compressor rotate to bring in and compress new air. Once started, it can thereby be seen that this process is self-sustaining.

Combustors for gas turbine engines typically have a combustor shell with a combustor liner therein and an air passage between the combustor shell and the combustor liner. In an annular combustor, an outer combustor liner and an inner combustor liner cooperate to define, and are separated by, an annular combustion chamber. The outer combustor liner is positioned radially inside the outer combustor shell and the inner combustor liner is positioned radially outside of the inner combustor shell. In such a combustor, there is at least one igniter for igniting the air-fuel mixture. In some combustor designs, the liners may be segmented into panels.

The combustor further has a bulkhead, which may be segmented into panels in some combustor designs, at a forward end of the combustor extending from the outer combustor shell to the inner combustor shell. At least one fuel injector extends through this bulkhead and into the combustion chamber to release the fuel. A swirler is generally positioned around each fuel injector to admit combustion air and create turbulence in said combustion air to mix the combustion air and the fuel before the mixture is combusted.

The fuel injector is a device for dispersing fuel into the combustor. However, a fuel injector may be used in other applications as well and not only to disperse fuel in a combustor of a gas turbine engine. Typically, the combustor will have at least one fuel injector nozzle extending through the bulkhead. The fuel enters a nozzle which atomizes the fuel to allow for greater air-fuel mixing before the combustion process.

Many prior art fuel nozzles impart swirl to the fuel before injection into the combustor to improve atomization. The swirl may be created by having one or more fuel inlets tangential to the nozzle or one or more vanes which generate swirl. The fuel passes from the inlets into a chamber in the nozzle before being injected into the combustor. Some prior art nozzles also limit the fuel flow into the combustor during low-power conditions thereby providing a smaller flow of fuel into the nozzle during the low-power conditions than during high-power conditions. Additionally, prior art fuel nozzles are fixed in orifice size, which causes atomization to vary as pressure drop and flow rate change.

While these prior art fuel nozzles are effective, they may not atomize the fuel adequately at both low-power, or low-flow, and high-power, or high-flow, conditions. Therefore, a fuel nozzle which can effectively atomize fuel during low and high power conditions and flow is needed.

SUMMARY OF THE DISCLOSURE

In accordance with one aspect of the disclosure, a fuel injector is disclosed. The fuel injector may comprise a nozzle defining a mixing chamber having an exit proximate a centerline of the nozzle, a first fuel line in fluid communication with the mixing chamber and terminating in a tangential fuel inlet positioned tangential to the centerline of the nozzle, and a second fuel line in fluid communication with the mixing chamber and terminating in a radial fuel inlet positioned radial to the centerline of the nozzle.

In another refinement, there may be a plurality of tangential fuel inlets.

In yet another refinement, there may be a plurality of radial fuel inlets.

In a refinement, the fuel injector may further include a valve which may control a flow of fuel to at least one of the first and second fuel lines.

In a further refinement, the valve may be a pressure valve having a spring-biased pin and metering slot.

In yet another further refinement, the valve may be an electronic valve controlled by a processor.

In another further refinement, the fuel injector may further include a manifold which may control fuel flow to each inlet.

In still yet another further refinement, the valve may be located distant and separate from the nozzle.

In accordance with another aspect of the disclosure, a combustor of a gas turbine engine is disclosed. The combustor may have an outer wall, an inner wall, a bulkhead spanning between the inner wall and the outer wall, with the bulkhead defining an annular combustion chamber. A fuel injector may extend through the bulkhead to the combustion chamber and include a nozzle defining a mixing chamber, a tangential inlet, a radial inlet, and an outlet in fluid communication with the mixing chamber.

In a refinement, the combustor may further include a valve which may control a flow of fuel to at least one of the tangential and radial inlets.

In a further refinement, the combustor may also include a plurality of tangential and radial inlets.

In accordance with yet another aspect of the disclosure, a method of supplying a flow of fuel to a combustor is disclosed. The method may include directing a tangential flow of fuel to a fuel nozzle, directing a radial flow of fuel to the fuel nozzle, mixing the tangential flow and radial flow in a mixing chamber of the fuel nozzle, and exiting the fuel through an outlet of the fuel nozzle.

In a refinement, the method may further include reducing tangential flow of fuel during a low-power operation.

In a refinement, the method may include increasing radial flow of fuel during high-power engine operation.

In a further refinement, the method may further include reducing tangential flow of fuel during a high-power operation.

In another refinement, the method may further include controlling the flow of fuel to each of the inlets via a valve.

In a further refinement, the method may further include gradually transitioning from a tangential flow of fuel during low-power operation to a radial flow of fuel during high-power operation using the valve.

In yet another refinement, the method may further include creating an atomized fuel mist during low-power operation by imparting swirl to the fuel.

In still yet another refinement, the method may further include creating an atomized fuel mist during high-power operations with a pressure drop in the fuel.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
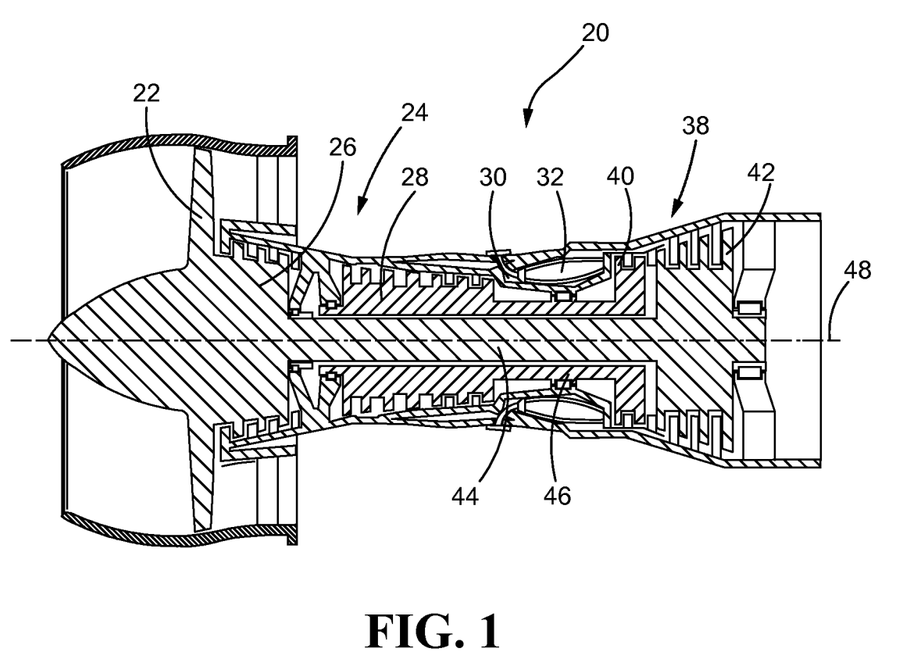
FIG. 1 is a cross-sectional view of a gas turbine engine constructed in accordance with the present disclosure.
Figure 2:
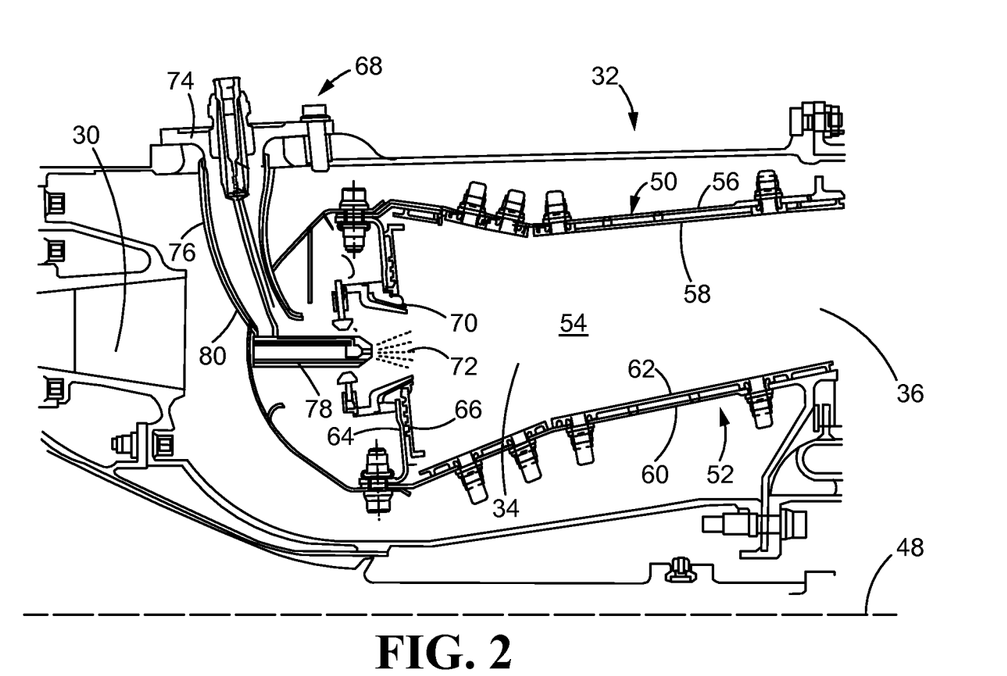
FIG. 2 is a cross-sectional view of a combustor constructed in accordance with the present disclosure.

Referring now to the drawings, and with specific reference to FIG. 1, a gas turbine engine is generally referred to by numeral 20. While the gas turbine engine 20 is depicted as a turbofan type of gas turbine engine, it is to be understood that the teachings of the present invention are applicable to other types of engines, or other types of spray systems, as well. The engine 20, as presented, has a fan 22 and compressor section 24 positioned at a forward end of the engine 20 to draw in and compress ambient air. The compressor section 24 depicted in FIG. 1 is a dual-spool compressor having a forward low-pressure compressor 26 and an aftward high-pressure compressor 28. Air from the fan 22 is compressed by the low-pressure compressor 26 and then further compressed by the high-pressure compressor 28 as the air travels aftward through the engine 20. The compressed air from the high-pressure compressor 28 then travels through a diffuser 30 positioned aft of the compressor section 24 and forward of a combustor 32, to reduce the speed of the compressed air before reaching the combustor 32. As best shown in FIG. 2, the compressed air enters into the combustor 32, primarily at a forward section 34 of the combustor 32, but also through air admittance holes (not shown) typically communicating through an aft section 36 of the combustor 32, to be combusted with a fuel. The compressed air also enters the combustor 32 throughout the combustor 32 for cooling purposes. Exhaust from the combustion process exits the combustor 32 at an aft section 36 of the combustor 32 and passes into a turbine section 38.

The turbine section 38 is positioned at an aft end of the engine 20 and is depicted in FIG. 1 as a dual-spool turbine having a forward high-pressure turbine 40 and an aftward low-pressure turbine 42. As the exhaust expands aftward through the turbine section 38, the turbines rotate on a pair of concentrically mounted engine shafts 44 and 46 around a central axis 48 extending axially through the engine 20 from fore to aft. The first shaft 44 is associated with the fan 22 and the low-pressure compressor 26 and turbine 42 while the second shaft 46 is associated with the high-pressure compressor 28 and turbine 40. As the engine shafts 44 and 46 are rotated by the exhaust expanding through the turbine section 38, the fan 12 and the compressor section 24 are rotated to draw in and compress more air. Thus, it can be seen that this process is self-sustaining once it has begun.

Referring now to FIG. 2, the combustor 32 is depicted as a double-walled annular combustor, centered on the central axis 48. However, any form of combustor may be utilized with the present disclosure such as, but not limited to, a single-wall annular combustor or a can combustor. The annular combustor 32 has an outer wall 50 and an inner wall 52 radially interior to and circumscribed by the outer wall 50. The walls 50 and 52 define, and are separated by, an annular combustion chamber 54. The outer wall 50 includes an outer shell 56 and an outer liner 58, while and the inner wall 52 includes an inner shell 60 and an inner liner 62. Each of the liners 58 and 62 are positioned within the combustion chamber 54 and connected to its associated shell to protect the shells 56 and 60 from high temperatures in the combustion chamber 54. A bulkhead 64 extends from the inner wall 52 to the outer wall 50 at a forward end of the forward section 34 of the combustor 32 and has a heat shield 66 mounted thereupon to protect the bulkhead 64 from high temperatures in the combustion chamber 54. The aft section 36 of the combustor 32 is open to allow exhaust from the combustion process to exit the combustor 32 and enter into the turbine section 38.

At least one fuel injector 68 extends into the combustion chamber 54 through the bulkhead 64. A swirler 70 may be generally positioned around the fuel injector 68 such that compressed air may be admitted through the swirler 70 to be mixed with a fuel 72 provided by the fuel injector 68. The swirler 70 may increase the turbulence in the air traveling through the swirler 70, which may increase the mixing of the air and fuel 72.

Figure 3:
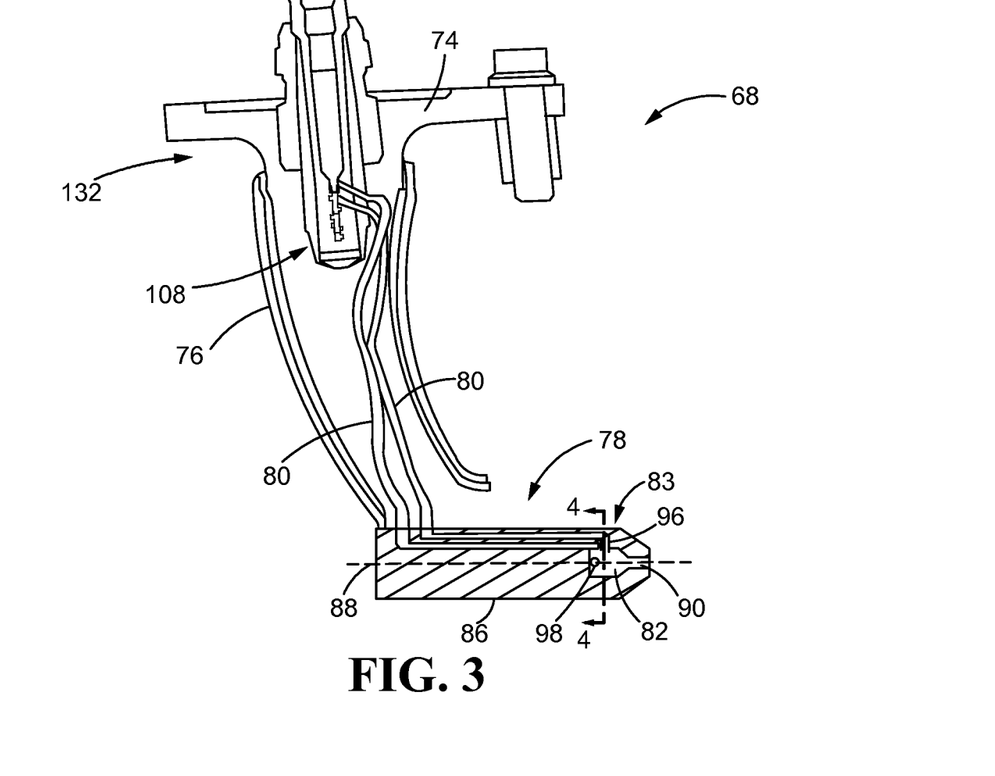
FIG. 3 is a cross-sectional view of a fuel injector constructed in accordance with the present disclosure and detailing a pressure atomized fuel nozzle.
Figure 4:
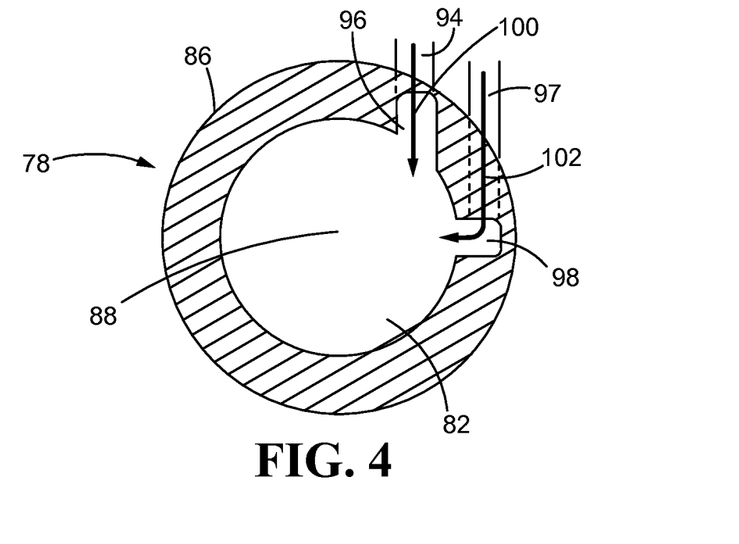
FIG. 4 is a cross-sectional view of the fuel nozzle of FIG. 3 taken along the line 4-4 of FIG. 3.

The fuel injector 68, as shown in FIG. 3, has a mount 74 to secure the fuel injector 68 to the engine 20 and a radial support 76 extending radially inward from the mount 72 to a nozzle 78, which extends axially through the bulkhead 68 to the combustion chamber 54. As depicted in FIGS. 3 and 4, the nozzle 78 is a pressure atomizing nozzle, but other types of nozzles such as air blast nozzles and others as described below, are possible as well. The support 76 incorporates a fuel line 80 to communicate fuel 72 to the nozzle 78. The fuel line 80 communicates fuel to a mixing chamber 82 of the nozzle 78 provided as a pressure chamber at a tip 83 of the nozzle 78 in the illustrated embodiment. The mixing chamber 82 of FIGS. 3 and 4 is cylindrical-shaped and defined by a surrounding nozzle outer wall 86, but it is to be understood that the mixing chamber 82 can be other shapes as well including, but not limited to, annular, or dumb-bell shaped in cross-section. The mixing chamber 82 may extend axially around a centerline 88 of the nozzle 78 all the way from a fuel inlet, further described below, to a nozzle outlet 90 positioned proximate to the centerline 88. In some embodiments, the outlet 90 may be centered directly on the center line 88, while in other embodiments, the outlet 90 may be otherwise proximate the centerline such as, but not limited to, at positions radially about the centerline 88.

Referring now to FIG. 4, the fuel nozzle 78 is shown to define a first fuel line 94 and a second fuel line 97, both of which receive fuel 72 from the main fuel line 80. The first fuel line 94 terminates in a tangential fuel inlet 96, while the second fuel line 97 terminates in a radial fuel inlet 98. As used herein, "tangential" and "radial" are used as directional modifiers relative to the axial centerline 88.

The tangential fuel inlet 96 supplies a tangential flow 100 of fuel 72 to the mixing chamber 82. This tangential flow 100 increases the swirl of the fuel 72 before exiting the nozzle 78, which in turn assists in atomizing the fuel 72 during low-power, or low-flow, operations.

On the other hand, the radial inlet 98 supplies a radial flow 102 of fuel 72 to the mixing chamber 82. This radial flow 102 creates a flow which has less swirl and fewer flow restrictions than the tangential flow 100. This is helpful during high-power operation in that the increased fuel flow and resulting pressure drop assist in improved atomization of the fuel 72.

Figure 7:
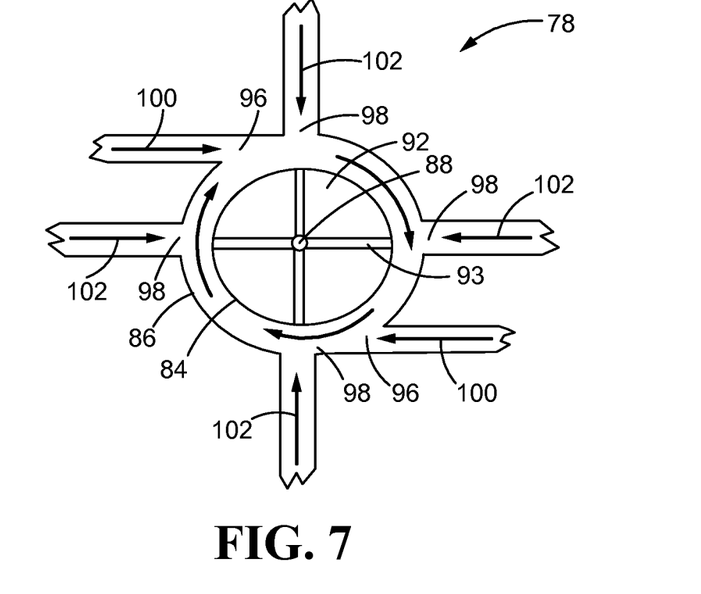
FIG. 7 is a cross-sectional view of another fuel nozzle constructed in accordance with the present disclosure and detailing multiple radial and tangential inlets.

While the fuel nozzle 78 has been described above as having only one tangential inlet 96 and one radial inlet 98, this is in no way limiting and any desired number of tangential or radial inlets may communicate fuel 72 into the fuel nozzle 78. For example, in FIG. 7 a pair of tangential inlets 96 and four radial inlets 98 communicate fuel 72 to the nozzle 78. Such additional inlets 96 and 98 may allow tailoring of the fuel flow into the combustor 32 during low-power, high-power, or both operations.

Figure 5:
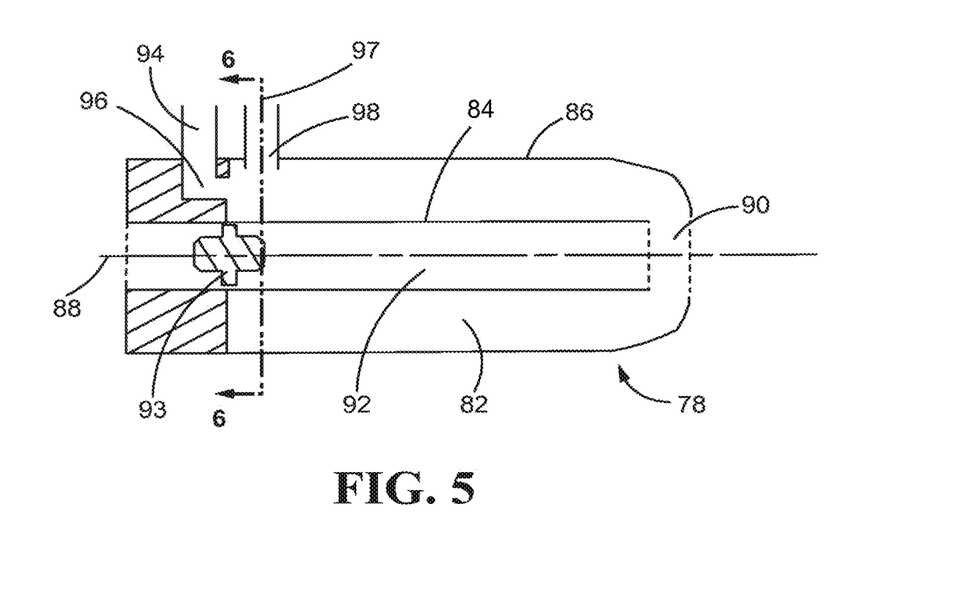
FIG. 5 is a cross-sectional view of another fuel nozzle constructed in accordance with the present disclosure and detailing an airblast atomized fuel nozzle.
Figure 6:
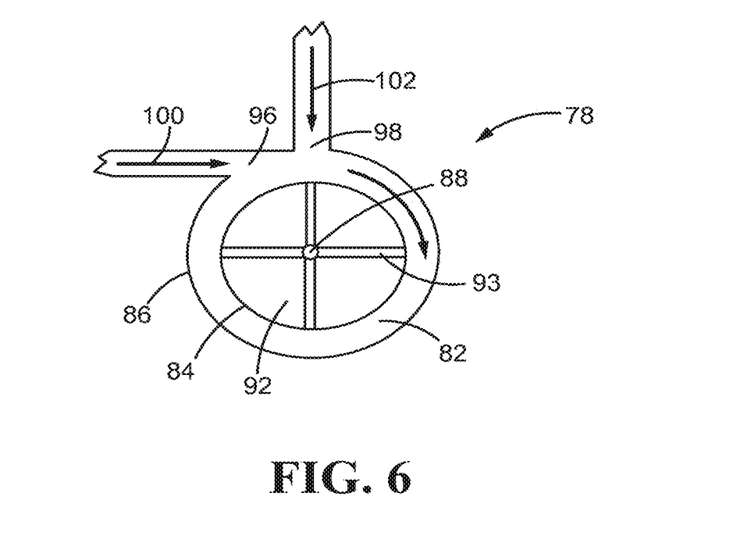
FIG. 6 is a cross-sectional view of the fuel nozzle of FIG. 5 taken along the line 6-6 of FIG. 5.

Turning now to FIGS. 5 and 6, the nozzle 78 is illustrated as an airblast fuel nozzle. The mixing chamber 82 may extend the length of the nozzle 78 and may be annular in shape, defined by an annular central wall 84 and the surrounding nozzle outer wall 86. The outlet 90 of FIG. 3 may be shaped as an annulus, but other shapes are possible including, but not limited to, cylindrical or dumb-bell shapes in cross-section, or a centralized hole in a disk-shaped chamber.

The nozzle 78 may also include an air channel 92 defined by annular central wall 84. The air channel 92 may also extend along the centerline 88, and allows compressed air to flow from the diffuser 30, through the nozzle 78 and outlet 90, and into the combustion chamber 54. A plurality of swirler vanes 93 may be positioned in the channel 92 to impart a swirl to the compressed air traveling through the channel 92 and increase mixing of the fuel 72 and air.

Figure 8:
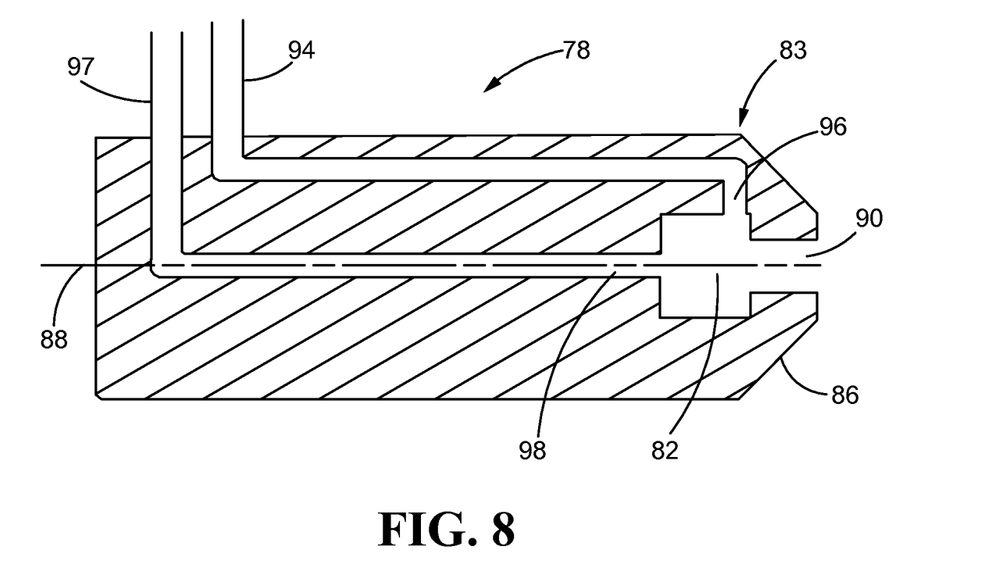
FIG. 8 is a cross-sectional view of yet another fuel nozzle constructed in accordance with the present disclosure and detailing a simplex fuel nozzle.
Figure 9:
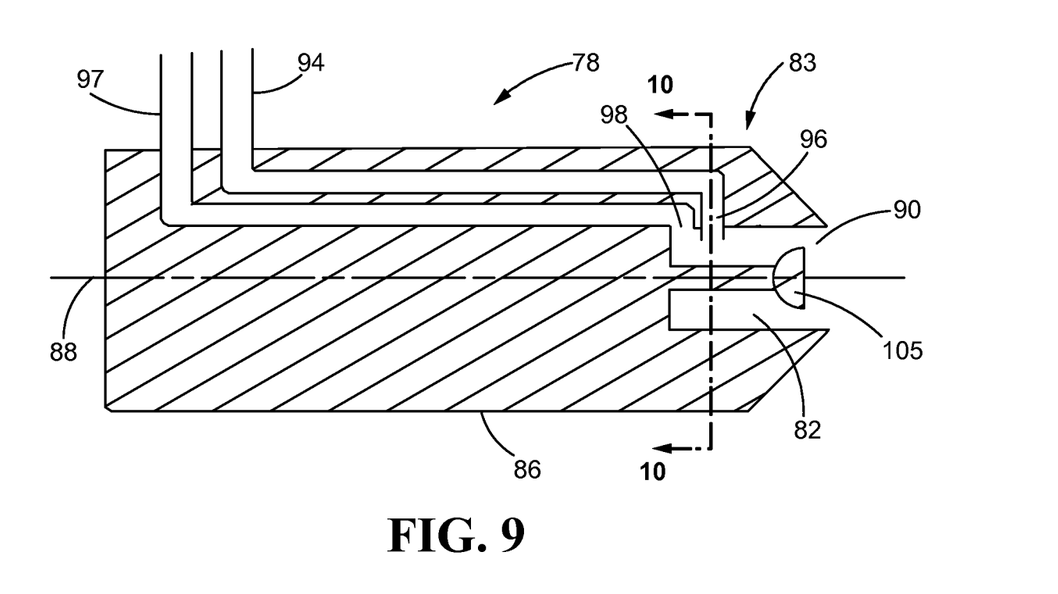
FIG. 9 is a cross-sectional view of still another fuel nozzle constructed in accordance with the present disclosure and detailing a simplex fuel nozzle with a pintle.
Figure 10:
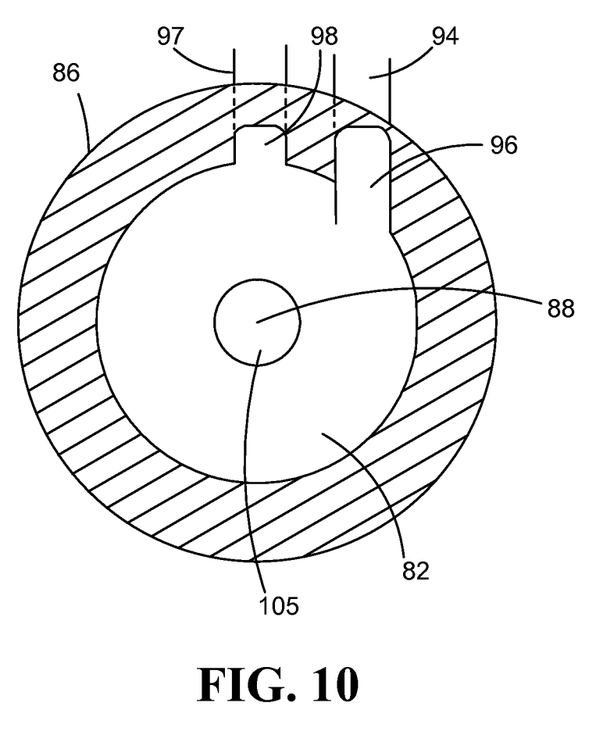
FIG. 10 is a cross-sectional view of the fuel nozzle of FIG. 9 taken along the line 10-10 of FIG. 9.

Another form of nozzle is depicted in FIGS. 8, 9, and 10. The nozzle 78 shown therein is a simplex nozzle where the mixing chamber 82 is provided at the tip 83 and is defined by the nozzle outer wall 86. Similar to the above embodiments though, the fuel line 80 communicates fuel 72 thereto through a tangential inlet 96 and a radial inlet 98. The nozzle outlet 90 allows the fuel 72 to flow from the tip cavity 104 into the combustor 54. As can be seen in FIGS. 9 and 10, a pintle 105 may also be used in conjunction with the radial inlet 98 as is known in the art to further affect flow.

Figure 11:
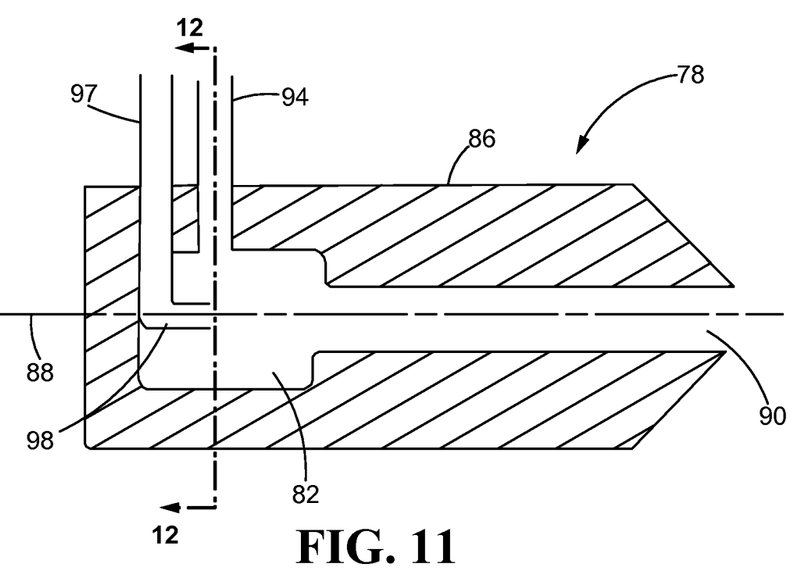
FIG. 11 is a cross-sectional view of still yet another fuel nozzle constructed in accordance with the resent disclosure and detailing a pressure atomizing fuel nozzle.
Figure 12:
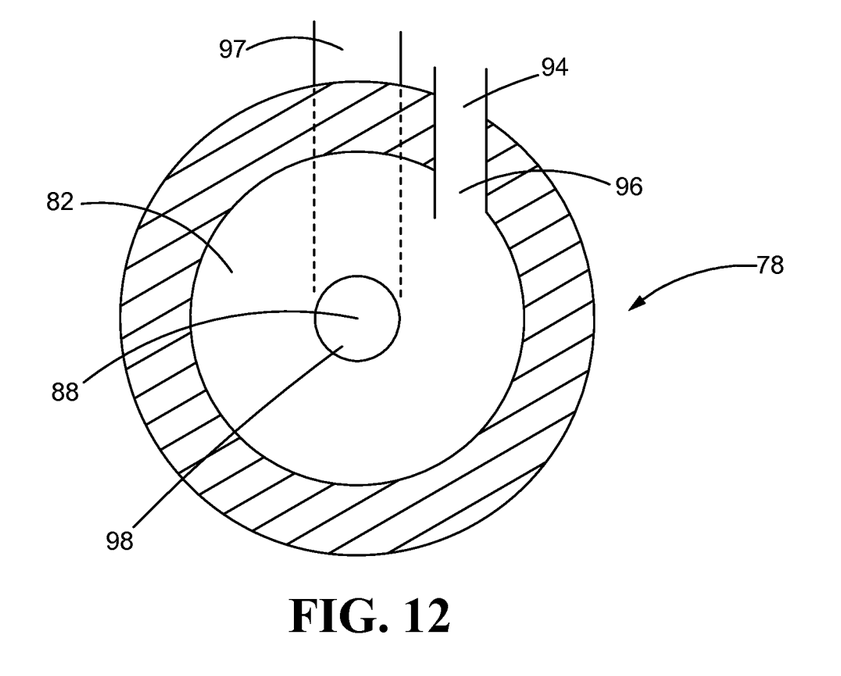
FIG. 12 is a cross-sectional view of the fuel nozzle of FIG. 11 taken along the line 12-12 of FIG. 11.

Another embodiment of the fuel nozzle 78 is depicted in FIGS. 11 and 12. As shown, the fuel nozzle may be another pressure atomizing fuel nozzle 78. In such an embodiment, the mixing chamber 82 is provided as a pressure chamber. Similar to the above embodiments though, the fuel line 80 communicates fuel 72 thereto via a tangential inlet 96 and a radial inlet 98. A nozzle outlet 90 in turn communicates the fuel 72 from the mixing chamber 82 to the combustion chamber 54.

Figure 13:
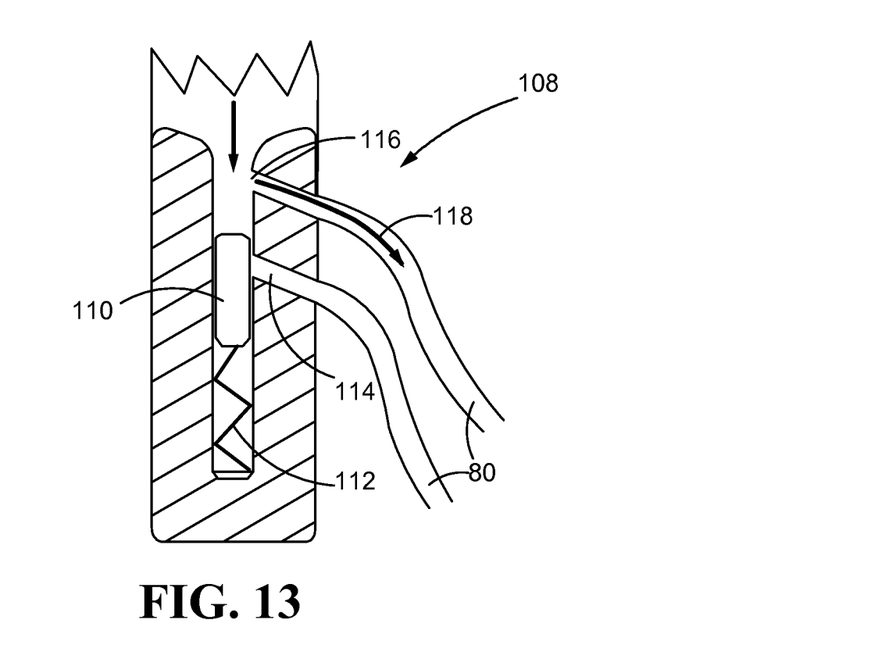
FIG. 13 is a cross-sectional view of a flow valve constructed in accordance with the present disclosure and depicting a low-power operational flow of fuel.
Figure 14:
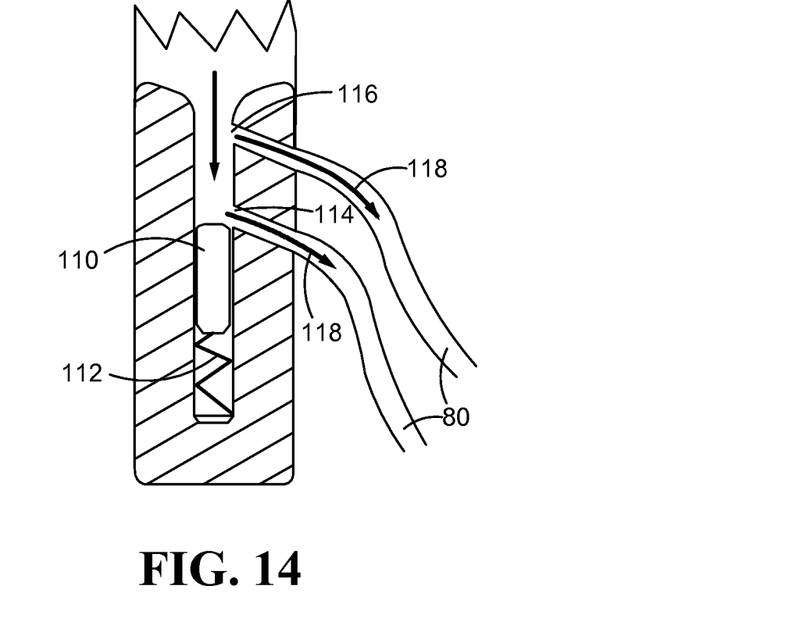
FIG. 14 is a cross-sectional view of another flow valve constructed in accordance with the present disclosure and depicting a high-power operational flow of fuel.

The fuel flow to each of the inlets 96 and 98 may be controlled by one or more flow valves 108, such as those depicted in FIGS. 13 and 14. The flow valve 108 may regulate the flow of fuel to each inlet 96 and 98 based on an operational power of the engine 20. The valve 108 of FIGS. 13 and 14 is a spring-loaded pressure valve having a pin 110 biased by a spring 112 to cover a first metering slot 114 and/or a second metering slot 116, but this is only exemplary, and of course any number of different types of valves may be employed. With this embodiment, however, the first metering slot 114 communicates with the radial inlet 98 and the second metering slot 116 communicates with the tangential inlet 96. The valve 108, as depicted in FIG. 13, is shown in a low-power state and thus only allows a flow 118 of fuel 72 to flow through the second metering slot 116 to the tangential inlet 96. However, as seen in FIG. 14, the valve 108 has moved to a high-power state which allows flow 118 through the first metering slot 114 to the radial inlet 98 as well.

The valve 108 transitions from the low-power state to the high-power state as the flow of fuel through the valve 108 increases, which increases the pressure on the pin 110 and depresses the spring 112. As the pin 110 and spring 112 are depressed a greater percentage of the fuel 72 is allowed to pass through the first metering slot 114. This gradual shift from low-power operation to high-power operation allows the fuel 72 to be supplied to each of the slots 114 and 116 in the necessary quantities to produce adequate atomization of the fuel for combustion at all engine power and fuel flow operations.

Figure 15:
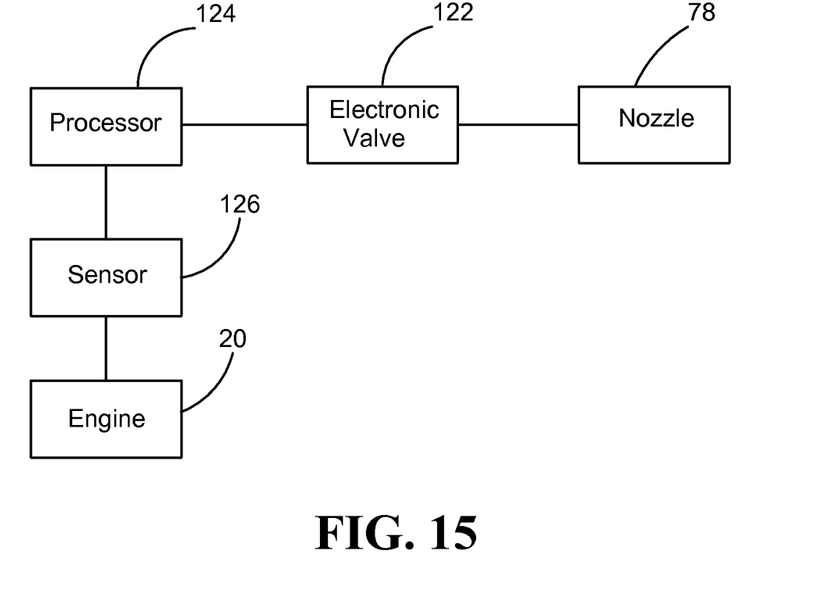
FIG. 15 is a schematic representation of another embodiment of the present disclosure employing an electronic valve.

The flow valve 108 may alternately be any known valve in the art which may accomplish the task of allowing a flow of fuel 72 to pass to the tangential inlet 96 during low-power operation, and a separate larger flow of fuel to pass to the radial inlet 98 during high-power operation such as, but not limited to, an electronic valve 122 controlled by a processor 24. In such a case, shown schematically in FIG. 15, the processor 124 could use a sensor 126 to monitor an operational power or fuel flow of the engine, and open or close the valve 122 accordingly.

Figure 16:
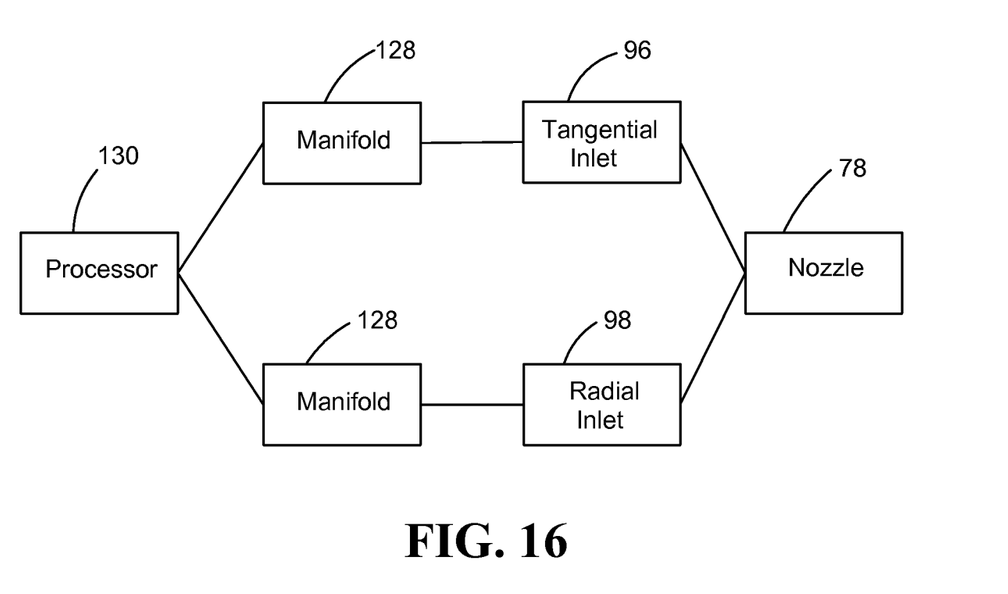
FIG. 16 is a schematic representation of another embodiment of the present disclosure employing manifolds.

Another exemplary embodiment, shown schematically in FIG. 16, may include separate manifolds 128 which communicate fuel 72 separately to each of the tangential and radial inlets 96 and 98. The manifolds 128 may be regulated by a processor 130 as with the electronic valve, or by any other known apparatus, to provide fuel 72 to one or both of the inlets 96 and 98 during high and low power engine operation.

As described herein, the flow valve 108 may be positioned either at the fuel nozzle 78, or distant, and as a separate element, from the fuel nozzle 78. In the exemplary embodiment presented in FIG. 3, the valve 108 is positioned at a radially distal end 132 of the fuel injector support 76. Such placement of the valve 108 has multiple advantages over the prior art. One such advantage is reducing the thermal stresses on the valve 108, caused by repetitive heating and cooling of the moving parts of the valve 108, which may reduce wear on, and increase longevity of the valve 108. Additionally, should the valve 108 malfunction or fail entirely, the placement of the valve 104 away from the fuel nozzle 78 allows for easier access to repair or replace the valve 108. Another advantage to such a configuration of the valve 108 and nozzle 78 is the removal of all moving parts from the nozzle 78, which also reduces wear on, and increases longevity of, the nozzle 78 since the nozzle 78 no longer contains any moving parts which can fail due to heat stress or age.

In operation, the fuel 72 may pass through the tangential inlet 96, the radial inlet 98, or both. While the engine 20 is operating at a low-power, a small flow of fuel 72 primarily enters the mixing chamber 82 through the tangential inlet 96, which increases the swirl and the atomization of the fuel 72 as the fuel 72 exits the nozzle 78 through the outlet 90. While the engine 20 is operating at a high-power, however, a large flow of fuel 72 primarily enters the mixing chamber 82 through the radial inlet 98 creating less swirl as well as reducing the restriction on the flow of the fuel 72. The large amount of fuel 72 flowing through the radial inlet 98 at the high operating power also creates a high pressure drop in the fuel 72, which creates good atomization as the fuel 72 exits the outlet 90. While the primary flow path of the fuel 72 during high operating power is through the radial inlet 98, a small flow of fuel 72 may also flow through the tangential inlet 96 into the mixing chamber as well. As a result, it can be seen that the flow exiting through the nozzle outlet 90 may have less swirl at high power, with an accompanying greater effective area, or higher swirl at low power with an accompanying lower effective are.

INDUSTRIAL APPLICABILITY

From the foregoing, it can be seen that the fuel nozzle disclosed herein has industrial applicability in a variety of settings such as, but not limited to, providing a variable flow of fuel to gas turbine engines. However, the teachings of this disclosure can be used with equal efficiency in connection with other liquid spraying systems as well, including, but not limited to, industrial furnaces or any other spraying system which requires a variable fluid flow with good atomization of the fluid upon distribution.

An engine utilizing this design may be used in conjunction with aircraft to generate power and thrust, with land based systems to generate power, or the like. Using the teachings of the present disclosure, a fuel injector and more specifically, a fuel nozzle may be constructed to provide a variable swirl and/or variable effective area. This improvement over the prior art may provide good atomization of the fuel during high and low power operations of an engine. Additionally, all moving parts may be removed from the fuel nozzle to reduce wear on, and increase longevity of, the fuel nozzle.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention include all equivalents falling within the spirit and scope of the appended claims.

What is claimed is:

1. A fuel injector, comprising:
   a nozzle having an outer wall defining a mixing chamber having an outlet proximate a centerline of the nozzle;
   a first fuel line in fluid communication with the mixing chamber, the first fuel line terminating in a tangential fuel inlet located in the outer wall; and
   a second fuel line in fluid communication with the mixing chamber, the second fuel line terminating in a radial fuel inlet located in the outer wall, the radial fuel inlet being orthogonal to the tangential fuel inlet.

2. The fuel injector of claim 1, further including a plurality of tangential fuel inlets.

3. The fuel injector of claim 1, further including a plurality of radial fuel inlets.

4. The fuel injector of claim 1, further including a valve, the valve controlling a flow of fuel to at least one of the first and second fuel lines.

5. The fuel injector of claim 4, wherein the valve is a pressure valve having a spring-biased pin and metering slot.

6. The fuel injector of claim 4, wherein the valve is an electronic valve controlled by a processor.

7. The fuel injector of claim 1, further including a manifold, the manifold controlling fuel flow to the radial fuel inlet and the tangential fuel inlet.

8. The fuel injector of claim 1, wherein the nozzle further defines an outlet in fluid communication with the mixing chamber, the outlet being annular in shape.

9. The fuel injector of claim 4, wherein the valve is located distant and separate from the nozzle.

10. A combustor of a gas turbine engine, comprising:
    an outer wall;
    an inner wall;
    a bulkhead spanning between the inner and outer walls, the outer wall, inner wall and bulkhead defining an annular combustion chamber; and
    a fuel injector extending through the bulkhead to the combustor chamber, the fuel injector including a nozzle having an outer nozzle wall defining a mixing chamber, the mixing chamber having an exit proximate a centerline of the nozzle;

a first fuel line in fluid communication with the mixing chamber, the first fuel line terminating in a tangential fuel inlet located in the outer nozzle wall; and a second fuel line in fluid communication with the mixing chamber, the second fuel line terminating in a radial fuel inlet located in the outer nozzle wall, the radial fuel inlet being orthogonal to the tangential fuel inlet.

11. The combustor of claim 10, further including a valve, the valve controlling a flow of fuel to at least one of the first fuel line and the second fuel line.

12. The combustor of claim 11, further including a plurality of tangential fuel inlets and a plurality of radial fuel inlets.

13. A method of supplying fuel to a combustor using a fuel injector comprising:

a fuel nozzle having an outer wall defining a mixing chamber having an outlet proximate a centerline of the fuel nozzle;

a first fuel line in fluid communication with the mixing chamber, the first fuel line terminating in a tangential fuel inlet located in the outer wall; and a second fuel line in fluid communication with the mixing chamber, the second fuel line terminating in a radial fuel inlet located in the outer wall, the radial fuel inlet being orthogonal to the tangential fuel inlet;

wherein the method comprises:

directing a tangential flow of fuel to the fuel nozzle;
directing a radial flow of fuel to the fuel nozzle;

mixing the tangential flow of fuel and the radial flow of fuel in the mixing chamber of the fuel nozzle; and exiting fuel through the outlet of the fuel nozzle.

14. The method of claim 13, further comprising reducing the tangential flow of fuel during a low-power engine operation.

15. The method of claim 13, further comprising increasing the radial flow of fuel during a high-power engine operation.

16. The method of claim 15, further comprising reducing the tangential flow of fuel during the high-power engine operation.

17. The method of claim 13, further comprising controlling the radial flow of fuel and the tangential flow of fuel via a valve.

18. The method of claim 17, further comprising gradually transitioning from the tangential flow of fuel during low-power operation to the radial flow of fuel during high-power operation using the valve.

19. The method of claim 13, further comprising creating an atomized fuel mist during low-power operations by imparting a swirl to the fuel.

20. The method of claim 13, further comprising creating an atomized fuel mist during high-power operations by creating a pressure drop in the fuel.

* * * * *